United States Patent
Herbach et al.

(10) Patent No.: US 11,947,353 B1
(45) Date of Patent: Apr. 2, 2024

(54) NON-PASSENGER REQUESTS FOR AUTONOMOUS VEHICLES

(71) Applicant: WAYMO LLC, Mountain View, CA (US)

(72) Inventors: Joshua Seth Herbach, San Francisco, CA (US); Philip Nemec, San Jose, CA (US); Peter Colijn, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 573 days.

(21) Appl. No.: 17/127,586

(22) Filed: Dec. 18, 2020

Related U.S. Application Data

(63) Continuation of application No. 14/721,634, filed on May 26, 2015, now Pat. No. 10,901,415.

(51) Int. Cl.
  *G08G 1/00* (2006.01)
  *G05D 1/00* (2006.01)
  (Continued)

(52) U.S. Cl.
  CPC ......... *G05D 1/0088* (2013.01); *G05D 1/0212* (2013.01); *G06F 9/4818* (2013.01);
  (Continued)

(58) Field of Classification Search
  CPC ....... G06F 9/4818; G07C 5/006; G07C 5/008; G07C 5/0808; G05D 1/0088;
  (Continued)

(56) References Cited

U.S. PATENT DOCUMENTS

| | | | |
|---|---|---|---|
| 5,327,557 A | 7/1994 | Emmond | |
| 5,521,579 A | 5/1996 | Bernhard | |

(Continued)

FOREIGN PATENT DOCUMENTS

| | | |
|---|---|---|
| CN | 103253273 A | 8/2013 |
| CN | 103339009 A | 10/2013 |

(Continued)

OTHER PUBLICATIONS

First Office Action for Chinese Patent Application No. 201680037342.8, dated Jul. 24, 2018.
(Continued)

*Primary Examiner* — Adam R Mott
*Assistant Examiner* — Heather J Keniry
(74) *Attorney, Agent, or Firm* — Botos Churchill IP Law

(57) ABSTRACT

Aspects of the disclosure relate to a system that includes a memory storing a queue for arranging tasks, a plurality of self-driving systems for controlling an autonomous vehicle, and one or more processors. The one or more processors may receive a non-passenger task request with a priority level of the non-passenger task request. When the non-passenger task request is accepted, the one or more processors may insert the task in the queue based on the priority level of the task request. Then, the one or more processors may provide instructions to one or more self-driving systems according to the non-passenger task request. Having received updates of the status of the autonomous vehicle, the one or more processors may determine that the task is completed based on the updates. After determining that the task is completed, the one or more processors may remove the task from the queue.

17 Claims, 11 Drawing Sheets

(51) Int. Cl.
*G05D 1/02* (2020.01)
*G06F 9/48* (2006.01)
*G06Q 10/02* (2012.01)
*G06Q 50/30* (2012.01)
*G07C 5/00* (2006.01)
*G07C 5/08* (2006.01)

(52) U.S. Cl.
CPC .............. *G06Q 10/02* (2013.01); *G06Q 50/30* (2013.01); *G07C 5/006* (2013.01); *G07C 5/008* (2013.01); *G07C 5/0808* (2013.01); *G08G 1/202* (2013.01); *G05D 2201/0212* (2013.01); *G05D 2201/0213* (2013.01)

(58) Field of Classification Search
CPC ......... G05D 1/0212; G05D 2201/0212; G05D 2201/0213; G06Q 10/02; G06Q 50/30; G08G 1/202
See application file for complete search history.

(56) References Cited

U.S. PATENT DOCUMENTS

| | | |
|---|---|---|
| 5,574,977 A | 11/1996 | Joseph |
| 5,774,668 A | 6/1998 | Choquier et al. |
| 5,787,545 A | 8/1998 | Colens |
| 5,835,870 A | 11/1998 | Kagawa |
| 5,838,562 A | 11/1998 | Gudat et al. |
| 5,906,645 A | 5/1999 | Kagawa et al. |
| 5,926,463 A | 7/1999 | Ahearn et al. |
| 5,930,511 A | 7/1999 | Hinsley |
| 5,956,665 A | 9/1999 | Martinez et al. |
| 6,079,258 A | 6/2000 | List et al. |
| 6,131,119 A | 10/2000 | Fukui |
| 6,185,487 B1 | 2/2001 | Kondo et al. |
| 6,260,058 B1 | 7/2001 | Hoenninger et al. |
| 6,282,175 B1 | 8/2001 | Steele et al. |
| 6,477,453 B2 | 11/2002 | Oi et al. |
| 6,862,732 B1 | 3/2005 | Schultz et al. |
| 7,844,396 B2 | 11/2010 | Zeitzew |
| 7,930,079 B2 | 4/2011 | Toya et al. |
| 8,190,322 B2 | 5/2012 | Lin et al. |
| 8,352,112 B2 | 1/2013 | Mudalige |
| 8,461,803 B2 | 6/2013 | Cohen et al. |
| 8,818,696 B2 | 8/2014 | Klooster et al. |
| 8,825,226 B1 | 9/2014 | Worley, III et al. |
| 8,836,490 B2 | 9/2014 | Silzer et al. |
| 8,854,001 B2 | 10/2014 | Cohen et al. |
| 8,874,305 B2 | 10/2014 | Dolgov et al. |
| 8,996,224 B1 | 3/2015 | Herbach et al. |
| 9,008,890 B1 | 4/2015 | Herbach et al. |
| 9,075,413 B2 | 7/2015 | Cullinane et al. |
| 9,352,752 B2 | 5/2016 | Cullinane et al. |
| 9,456,302 B2 | 9/2016 | Skomra et al. |
| 9,511,779 B2 | 12/2016 | Cullinane et al. |
| 9,552,564 B1 | 1/2017 | Martenis |
| 9,663,117 B2 | 5/2017 | Cullinane et al. |
| 9,821,818 B2 | 11/2017 | Cullinane et al. |
| 10,000,216 B2 | 6/2018 | Cullinane et al. |
| 10,044,817 B2 | 8/2018 | Vuyyuru et al. |
| 10,152,053 B1 | 12/2018 | Smith et al. |
| 10,423,934 B1 | 9/2019 | Zanghi et al. |
| 10,475,345 B2 | 11/2019 | Herbach et al. |
| 2001/0016790 A1 | 8/2001 | Kubo et al. |
| 2005/0132024 A1 | 6/2005 | Habaguchi et al. |
| 2007/0005202 A1 | 1/2007 | Breed |
| 2007/0057781 A1 | 3/2007 | Breed |
| 2007/0104208 A1 | 5/2007 | Svensson |
| 2009/0210114 A1 | 8/2009 | Baumann et al. |
| 2010/0217482 A1 | 8/2010 | Vogel et al. |
| 2010/0286845 A1 | 11/2010 | Rekow et al. |
| 2011/0046845 A1 | 2/2011 | Kozlay |
| 2011/0241862 A1 | 10/2011 | Debouk et al. |
| 2012/0083959 A1 | 4/2012 | Dolgov et al. |
| 2013/0145482 A1 | 6/2013 | Ricci et al. |
| 2013/0290970 A1 | 10/2013 | Shah et al. |
| 2014/0074339 A1 | 3/2014 | Casado et al. |
| 2014/0113619 A1 | 4/2014 | Tibbitts et al. |
| 2014/0136414 A1 | 5/2014 | Abhyanker |
| 2014/0156133 A1 | 6/2014 | Cullinane et al. |
| 2014/0207352 A1 | 7/2014 | Rossi et al. |
| 2014/0207535 A1 | 7/2014 | Stefan et al. |
| 2014/0213238 A1* | 7/2014 | Giraud .................. G07C 5/008 455/418 |
| 2014/0249693 A1 | 9/2014 | Stark et al. |
| 2014/0309814 A1 | 10/2014 | Ricci et al. |
| 2014/0330478 A1 | 11/2014 | Cullinane et al. |
| 2014/0342834 A1 | 11/2014 | Tappeiner et al. |
| 2015/0032293 A1 | 1/2015 | O'Neill et al. |
| 2015/0051778 A1 | 2/2015 | Mueller |
| 2015/0051779 A1 | 2/2015 | Camacho-Cook et al. |
| 2015/0233719 A1 | 8/2015 | Cudak et al. |
| 2016/0033297 A1 | 2/2016 | Konishi et al. |
| 2016/0086391 A1* | 3/2016 | Ricci ..................... G06Q 30/06 701/29.3 |
| 2016/0200326 A1 | 7/2016 | Cullinane et al. |
| 2017/0043788 A1 | 2/2017 | Cullinane et al. |
| 2017/0253253 A1 | 9/2017 | Cullinane et al. |
| 2017/0308090 A1 | 10/2017 | Asakura |
| 2018/0012151 A1 | 1/2018 | Wang |
| 2018/0043904 A1 | 2/2018 | Cullinane et al. |
| 2018/0060827 A1 | 3/2018 | Abbas et al. |
| 2018/0203451 A1 | 7/2018 | Cronin et al. |
| 2018/0322431 A1 | 11/2018 | Folck |
| 2018/0356821 A1 | 12/2018 | Kentley-Klay et al. |
| 2019/0043364 A1 | 2/2019 | Jumpertz |
| 2019/0057326 A1 | 2/2019 | Li et al. |
| 2019/0121357 A1 | 4/2019 | Zhang et al. |
| 2019/0195643 A1 | 6/2019 | Matsuoka et al. |
| 2019/0197454 A1 | 6/2019 | Muta et al. |
| 2020/0004245 A1 | 1/2020 | Rychtyckyj et al. |
| 2020/0027354 A1 | 1/2020 | Goldman et al. |
| 2020/0042019 A1 | 2/2020 | Marczuk et al. |
| 2020/0084193 A1 | 3/2020 | Beaurepaire et al. |
| 2020/0116512 A1 | 4/2020 | Sugimura et al. |
| 2020/0175428 A1 | 6/2020 | Mercay et al. |
| 2020/0193812 A1 | 6/2020 | Morris |
| 2020/0193835 A1 | 6/2020 | Kamata et al. |
| 2020/0242944 A1 | 7/2020 | Barberis et al. |
| 2020/0247357 A1 | 8/2020 | Wengreen et al. |
| 2020/0249047 A1 | 8/2020 | Balva |

FOREIGN PATENT DOCUMENTS

| | | |
|---|---|---|
| CN | 103339010 A | 10/2013 |
| CN | 103402839 A | 11/2013 |
| CN | 104395168 A | 3/2015 |
| DE | 69512414 T2 | 10/1999 |
| DE | 102004057604 A1 | 6/2006 |
| DE | 102011015130 A1 | 12/2011 |
| DE | 102011114072 A1 | 3/2013 |
| EP | 2390862 A2 | 11/2011 |
| JP | 2000039328 A | 2/2000 |
| JP | 2002140797 A | 5/2002 |
| JP | 2006126107 A | 5/2006 |
| JP | 2010134945 A | 6/2010 |
| JP | 2011240816 A | 12/2011 |
| JP | 2012056417 A | 3/2012 |
| JP | 2012518789 A | 8/2012 |
| JP | 2012220286 A | 11/2012 |
| JP | 2013544697 A | 12/2013 |
| JP | 2014157021 A | 8/2014 |
| JP | 2015072651 A | 4/2015 |
| JP | 2015092320 A | 5/2015 |
| WO | 9602883 A1 | 2/1996 |
| WO | 2010060720 A2 | 6/2010 |
| WO | 20110158347 A1 | 12/2011 |
| WO | 2012083062 A1 | 6/2012 |
| WO | WO-2012154451 A2 * | 11/2012 ............ B60L 11/184 |
| WO | 2013162847 A1 | 10/2013 |

(56) References Cited

FOREIGN PATENT DOCUMENTS

| WO | 2015000739 A1 | 1/2015 |
|---|---|---|
| WO | 2015166811 A1 | 11/2015 |

OTHER PUBLICATIONS

Guo, Longxiang, et al. "Automatic sensor correction of autonomous vehicles by human-vehicle teaching-and-learning." IEEE Transactions on Vehicular Technology 67.9 (2018): pp. 8085-8099. (Year: 2018).

Japanese Notice of Reasons For Rejection for Application No. 2018-231175 dated Feb. 13, 2020.

Japanese Notice of Reasons For Rejection for Application No. 2018-231175 dated Jan. 5, 2022.

Kato, Shinpei, et al. "An open approach to autonomous vehicles." IEEE Micro 35.6 (2015): pp. 60-68. (Year: 2015).

Koopman, Philip, and Beth Osyk. "Safety argument considerations for public road testing of autonomous vehicles." SAE International Journal of Advances and Current Practices in Mobility 1.2019-01-0123 (2019): pp. 512-523. (Year: 2019).

Li, Qing, Nanning Zheng, and Hong Cheng. "Springrobot: A prototype autonomous vehicle and its algorithms for lane detection." IEEE Transactions on Intelligent Transportation Systems 5.4 (2004): pp. 300-308. (Year: 2004).

Office Action for Japanese Patent Application No. 2017-560197 dated May 28, 2018.

Office Action for Korean Application No. 10-2021-7012653 dated Jun. 29, 2021.

Republic of Korea Notice of Preliminary Rejection for Application No. 10-2018-7037761 dated Feb. 20, 2020.

Second Office Action for Chinese Patent Application No. 201680037342.8, dated Dec. 6, 2018.

Szigeti, Szilard, Csaba Csiszar, and David Foldes. "Information management of demand-responsive mobility service based on autonomous vehicles." Procedia Engineering 187 (2017): pp. 483-491. (Year: 2017).

The Extended European Search Report for European Patent Application No. 22150552.2, dated Apr. 8, 2022.

The First Office Action for Chinese Patent Application No. 201910415237.9, dated Nov. 17, 2021.

Wei, Junqing, et al. "Towards a viable autonomous driving research platform." 2013 IEEE Intelligent Vehicles Symposium (IV). IEEE, 2013.pp.763-770 (Year: 2013).

Rajamani, Rajesh, et al. "A complete fault diagnostic system for automated vehicles operating in a platoon." IEEE transactions on control systems technology 9.4., 2001, pp. 553-564.

Isermann, Rolf. "Model-based fault-detection and diagnosis-status and applications." Annual Reviews in control 29.1., 2005, pp. 71-85.

Anthony, Richard, et al. "Towards a dynamically reconfigurable automotive control system architecture." Embedded System Design: Topics, Techniques and Trends. Springer, Boston, MA., 2007, pp. 71-84.

Anonymous , "Autonome Fahrzeuge: Roboterautos als Autos der Zukunfl schon heute", Autonomes Fahren & Co., XP055297193, retrieved from the Internet: <http://www.autonomes-fahren.de/autonome-fahrzeuge-die-zukunft-der-automobilitat/>.

Divakarla,, Kavya Prabha,, et al., ""A cognitive advanced driver assistance systems architecture for autonomous-capable electrified vehicles."", IEEE Transactions on Transportation Electrification 5.1 (2018): pp. 48-58. (Year: 2018).

Frazzoli , et al., Frazzoli, Emilio, Munther A. Dahleh, and Eric Feron. "Maneuver-based motion planning for nonlinear systems with symmetries." IEEE transactions on robotics 21.6 (2005): pp. 1077-1091. (Year: 2005).

Frazzoli , et al., Frazzoli, Emilio, Munther A. Dahleh, and Eric Feron. "Robust hybrid control for autonomous vehicle motion planning." Proceedings of the 39th IEEE Conference on Decision and Control (Cat. No. 00CH37187). vol. 1. IEEE, 2000.pp.821-826 (Year: 2000).

Gavrilets, Vladislav , et al., "Aggressive maneuvering of small autonomous helicopters: A human-centered approach." The International Journal of Robotics Research 20.10 (2001): pp. 795-807. (Year: 2001).

Gerber, Michael A., et al., ""Self-Interruptions of Non-Driving Related Tasks in Automated Vehicles: Mobile vs Head-Up Display."", Proceedings of the 2020 CH I Conference on Human Factors in Computing Systems. 2020.pp. 1-9 (Year: 2020).

Marshall Hartman , "Autonomous Driving: Developing Failsafe Systems and Smart Sensor Technology to Improve Safety", Available at: <http://www.pitt.edu/~mdh78/Trends.html>, Mar. 11, 2015, 3 pages.

Takacs, Arpad, et al., ""Assessment and standardization of autonomous vehicles."", 2018 IEEE 22nd International Conference on Intelligent Engineering Systems (INES). IEEE, 2018.pp.000185-000192 (Year: 2018).

Yuan et al. "Simultaneous Dynamic Scheduling and Collision-Free Path Planning for Multiple Autonomous Vehicles." Proceedings of the 2009 IEEE International Conference on Information and Automation. (Year: 2009).

"International Search Report and Written Opinion for PCT Application No. PCT/US2016/033728, dated Sep. 2, 2016", 13 pages.

Antonucci , et al., "The automatic vehicles access control system of the historical centre of Rome", WIT Transactions on Ecology and the Environment 54, 2002, pp. 853-861.

Bertozzi , et al., "Vision-based intelligent vehicles: State of the art and perspectives", Robotics and Autonomous systems, vol. 32, 2000, pp. 1-16.

Bill McBeath , "How the Internet-of-Things is Transforming Mining", Available at: <http://www.clresearch.com/research/detail.cfm?guid=A5E6FEAF-3048-79ED-99C9-EA62EBCCD605>, Nov. 13, 2014, 4 pages.

Hafid Niniss , "Development of an Autonomous UAV Managed by Virtual Reality", Available at: <http://ftp.forum8.co.jp/forum8lib/pdf/UAV.pdf>, Sep. 9, 2012, 5 pages.

Kapellos, Konstantinos , et al., "Specification, formal verification and implementation of tasks and missions for an autonomous vehicle", Experimental Robotics, IV, Springer Berlin Heidelberg, 1997, pp. 412-421.

Kim, Junsung , et al., "Parallel scheduling for cyber-physical systems: Analysis and case study on a self-driving car", Proceedings of the ACM/IEEE, 4th International Conference on Cyber-Physical Systems, 2013, pp. 31-40.

Leonard, John , et al., "A perception-driven autonomous urban vehicle", Journal of Field Robotics, vol. 25, No. 10, 2008, pp. 727-774.

O'Connor , et al., "Automatic steering of farm vehicles using GPS", Precision Agriculture precisionagricu3, 1996, pp. 767-777.

Objection to European Patent 3 304 233 B1, Nov. 16, 2022.

"International Workshop on Safe Navigation in Open and Dynamic Environments Application to Autonomous Vehicles", IEEE International Conference on Robotics and Automation, Kobe, Japan (2009).

"Taxonomy and Definitions for Terms Related to On-Road Motor Vehicle Automated Driving Systems", SAE International J3016, pp. 1-12 (2014).

Blackmore , et al., "A Specification of Behavioural Requirements for an Autonomous Tractor", 6th International Symposium on Fruit, Nut and Vegetable Production Engineering Conference, 17 Pages (2001).

Conesa-Muñoz , et al., "Distributed Multi-Level Supervision to Effectively Monitor the Operations of a Fleet of Autonomous Vehicles in Agricultural Tasks", Sensors, vol. 15, pp. 5402-5428 (2015).

Shladover , et al., "Automated Vehicles for Highway Operations (Automated Highway Systems)", Proc. IMechE, vol. 219, Part I: J. Systems and Control Engineering, pp. 53-75 (2003).

Stump , et al., "Multi-Robot Persistence Surveillance Planning as a Vehicle Routing Problem", IEEE International Conference on Automation Science and Engineering, pp. 569-575 (2011).

(56) References Cited

OTHER PUBLICATIONS

Horwick, Markus, and Karl-Heinz Siedersberger. "Strategy and Architecture of a Safety Concept for Fully Automatic and Autonomous Driving Assistance Systems." 2010 IEEE Intelligent Vehicles Symposium. IEEE, 2010, pp. 955-960 (Year: 2010).

Petit, Jonathan, and Steven E. Shladover. "Potential cyberattacks on automated vehicles." IEEE Transactions on Intelligent transportation systems 16.2 (2014):pp. 546-556. (Year: 2014).

Reschka, Andreas, et al., "A surveillance and safety system based on performance criteria and functional degradation for an autonomous vehicle." 2012 15th International IEEE Conference on Intelligent Transportation Systems. IEEE, 2012.pp.237-242 (Year: 2012).

Notice of Reasons for Rejections for Japanese Patent Application No. 2022-067503, dated Sep. 4, 2023, 7 Pages.

Broggi, Alberto, et al., "Car-driver cooperation in future vehicles." Procs. Intl. Conf. on Models and Technologies for Intelligent Transportation Systems, Rome, Italy (Jun. 2009). 2009.pp. 1-4 (Year: 2009).

Durfee, Edmund H., et al., "Integrated premission planning and execution for unmanned ground vehicles." Proceedings of the First International Conference on Autonomous Agents. 1997.pp. 348-354 (Year: 1997).

Franke, Uwe, et al., "Autonomous driving goes downtown." IEEE Intelligent Systems and Their Applications 13.6 (1998): 40-48. (Year: 1998).

\* cited by examiner

400

800

1000

NON-PASSENGER REQUESTS FOR AUTONOMOUS VEHICLES

CROSS-REFERENCE TO PREVIOUS APPLICATION

This application is a continuation of U.S. application Ser. No. 14/721,634, filed on May 26, 2015, the disclosure of which is incorporated herein by reference.

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a destination, and the vehicle maneuvers itself to that destination.

BRIEF SUMMARY

One aspect of the disclosure provides a system. The system includes a memory storing a queue for arranging tasks, a plurality of self-driving systems for controlling an autonomous vehicle, and one or more processors. The one or more processors are configured to receive a non-passenger task request and a priority level of the non-passenger task request, the non-passenger task request being unrelated to transporting a passenger in the autonomous vehicle and including instructions for executing a task; when the non-passenger task request is accepted, insert the task in the queue based on the priority level of the task request; provide instructions to one or more self-driving systems according to the instructions of the non-passenger task request; receive updates of the status of the autonomous vehicle; determine that the task is completed based on the updates; and after determining that the task is completed, remove the task from the queue.

In one example, the one or more processors are also configured to determine whether to reject or accept the task request based on a plurality of rejection reasons, the plurality of rejection reasons including: (1) the autonomous vehicle is currently executing a task which does not allow preemption by the task request; (2) the task request is malformed; and (3) the vehicle is not capable of performing the task request. In this example, the one or more processors are also configured to send a rejection notification when the task request is rejected. The rejection notification includes one or more true rejection reasons.

In another example the task involves parking the vehicle; and the one or more processors are also configured to determine that the task is completed by performing checks on the vehicle to ensure that the vehicle is firmly parked. In yet another example, the instructions include instructions to stop executing a current task request; and the one or more processors are also configured to stop executing the current task request.

In another example, the one or more processors are also configured to receive the non-passenger task request and the priority level of the non-passenger task request in association with a passenger-related task request. The passenger-related task request is related to transporting a passenger in the autonomous vehicle. In this example, the non-passenger task request is inserted in the queue after the passenger-related task request.

In yet another example, the system of claim 1 also includes the vehicle.

Another aspect of the disclosure provides a fleet management system. The fleet management system includes one or more server computing devices including one or more processors configured to receive updates regarding the status of the plurality of vehicles; generating a dispatch command including a non-passenger task request and a priority level of the non-passenger task request, the non-passenger task request being unrelated to transporting a passenger in an autonomous vehicle and including instructions for executing a task; and send a dispatch command to an autonomous vehicle.

In one example, the one or more processors are also configured to receive a user task request from a user device; and wherein the dispatch command is generated according to the user task request. In another example, the one or more processors are also configured to receive a rejection notification from the vehicle, including one or more rejection reasons when the vehicle's computing device has rejected the task request. In yet another example, the dispatch command is generated to also include a passenger-related task request and a corresponding priority level. The passenger-related task request is related to transporting a passenger in an autonomous vehicle and has a higher priority level than the non-passenger task request. In another example, the fleet management system also includes one or more vehicles capable of autonomously driving.

Yet another aspect of the disclosure provides a method for performing driving tasks unrelated to transporting passengers in an autonomous vehicle. The method includes receiving, by one or more processors, a non-passenger task request and a priority level of the non-passenger task request, the non-passenger task request being unrelated to transporting a passenger in an autonomous vehicle and including instructions for executing a task; when the non-passenger task request is accepted, inserting, by the one or more processors, the task in a queue based on the priority level of the task request; providing, by the one or more processors, instructions to one or more self-driving systems according to the instructions of the non-passenger task request; receiving, by the one or more processors, updates of the status of the autonomous vehicle; determining, by the one or more processors, that the task is completed based on the updates; and after determining that the task is completed, removing, by the one or more processors, the task from the queue.

In one example, the method also includes determining, by the one or more processors, whether to reject or accept the task request based on a plurality of rejection reasons. The plurality of rejection reasons includes (1) the autonomous vehicle is handling a task which does not allow preemption by the task request; (2) the request is malformed; and (3) the vehicle is not capable of performing the request. In this example, the method also includes sending, by the one or more processors, a rejection notification if the task request is rejected. The rejection notification includes one or more true rejection reasons.

In another example, the task involves parking the vehicle; and the method also includes determining, by the one or more processors, that the task is completed by performing checks on the vehicle to ensure that the vehicle is firmly parked. In yet another example, the instructions to the one or more self-driving systems based on the task request includes instructions to stop executing a current task request; and the method also includes stopping, by the one or more processors, execution of the current task request.

In another example, the method also includes receiving, by the one or more processors, a non-passenger task request and a priority level of the non-passenger task request in association with a passenger task request. The passenger-related task request is related to transporting a passenger in the autonomous vehicle. In this example, the method also includes inserting, by the one or more processors, non-passenger task request in the queue after the passenger-related task request.

DETAILED DESCRIPTION

Figure 1:
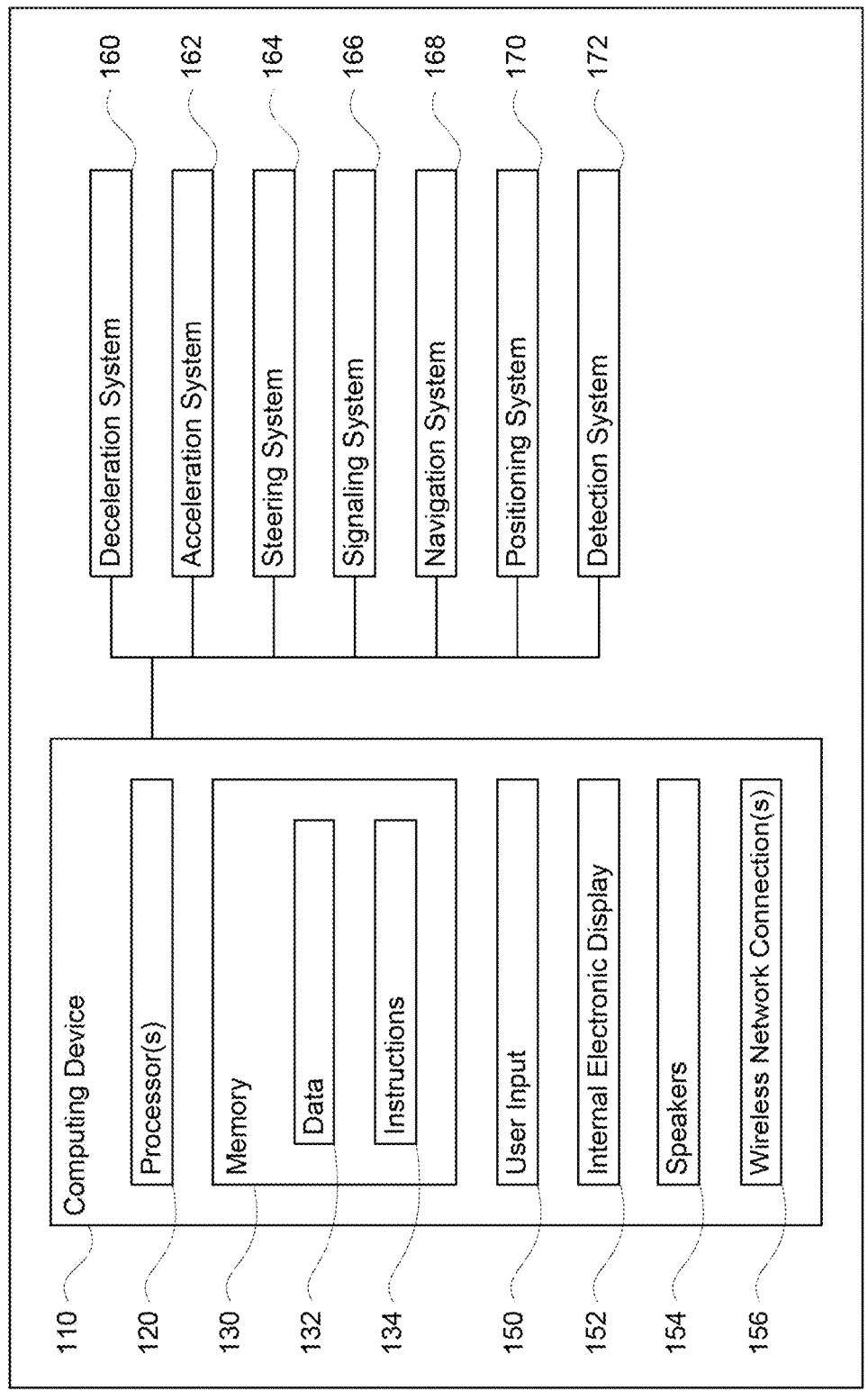
FIG. 1 is a functional diagram of an example vehicle in accordance with an exemplary embodiment.

The technology relates to an autonomous vehicle for autonomously executing tasks provided by a remote dispatching system. These tasks may include requests unrelated to moving passengers or non-passenger tasks and also passenger-related tasks. In this regard, non-passenger tasks may include, for example, pre-positioning, refueling/recharging, parking, going for maintenance, circling the block, and updating software. Passenger-related tasks may include, for example, a trip to a destination. When associated with a passenger-related task, non-passenger tasks are generally performed after the passenger-related task. The tasks may be initiated by a user or by a server computing device in the dispatching system. Non-passenger tasks for an autonomous vehicle ensure that after a passenger-related task is completed, even if there are no other trips to be executed, the vehicle may have a task to perform while it awaits another passenger-related request. In addition, certain non-passenger tasks are important to ensure the proper operation of the autonomous vehicle, such as making sure it has enough fuel or is in good working order.

In one example, a server computing device may send a task request to a vehicle, such as an autonomous vehicle. The task request may include information requesting that a vehicle to perform a particular task. For a non-passenger task, the request may include instructions to the vehicle's computing device for performing a task unrelated to transporting a passenger. For a passenger-related task, the request may include information for a trip that is sent to a server computing device via a client computing device. The received task requests may be stored as a task in a task queue for action by one or more computing devices in the vehicle.

The non-passenger task request may be sent in as part of a task request for a passenger-related task, or a trip request.

In addition, a non-passenger task request may be transmitted to a vehicle at a certain moment in time based on the state of the vehicle. The vehicle's computing device may be continuously publishing measurements from the instruments and gauges of the vehicle. If measurements from the instruments and gauges reach a threshold, the server computing device may initiate a particular non-passenger task request.

Different levels of detail may be specified in the non-passenger task request depending on the nature of the non-passenger task. In particular, a priority level of tasks may be specified. The priority level may include details as to when the task should be executed in relation to existing tasks. The priority level may also include what types of non-passenger or passenger tasks may interrupt the task or set the priority of the recharging task to prohibit preemption by any incoming tasks.

The vehicle's computing device may receive a task while be parked or performing another task. The incoming task may be rejected by a vehicle's computing devices for any one of enumerated rejection reasons. If rejected, the vehicle's computing devices may send a response to the server computing device or the client computing device indicating that the task request was rejected and the reason for the rejection. However, if accepted, the task specified by the task request may be inserted in the queue based on how the task's priority level ranks in relation to the priority level of the existing tasks.

The vehicle's computing device may utilize one or more systems to execute a task depending on a type of that task. The vehicle's computing devices may send instructions regarding execution of a task, such as control commands and navigation commands, to one or more of the vehicle's systems. For example, a task to park the vehicle, may involve only the self-driving systems. A task to refuel and/or recharge or to perform some maintenance or service, may involve the self-driving systems as well as other systems. An authentication or communication system may be used to perform any authentication or communication between the vehicle and the system performing the refueling/recharging.

After a task is completed, the vehicle's computing device may be confirmed that the task is complete. This may involve running various checks on the vehicle's systems. For some tasks, no completion confirmation may be performed or required. Rather, the vehicle may remain in the same state until a higher priority task is received.

After confirming completion, the completed task may be cleared from the queue. Other passenger-related or non-passenger tasks that are in the queue may then be performed. If there are no other tasks in the queue, a default action may be performed or, as mentioned previously, the same state may be maintained until further instructions are received.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 132 and data 134 that may be executed or otherwise used by the processor

120. For example, tasks to be executed by the vehicle 100 may be stored in a task queue in the memory 130. In addition, one or more enumerated rejection reasons may be stored in the memory 130 for use in determining whether tasks are rejected or accepted and inserted in the queue.

The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing device 110 may all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio-visual experiences. In this regard, internal electronic display 152 may be located within a cabin of vehicle 100 and may be used by computing device 110 to provide information to passengers within the vehicle 100.

Computing device 110 may also include one or more wireless network connections 154 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing device 110 may be an autonomous driving computing system incorporated into vehicle 100. The autonomous driving computing system may capable of communicating with various components of the vehicle. For example, returning to FIG. 1, computing device 110 may be in communication with various systems of vehicle 100, such as deceleration system 160, acceleration system 162, steering system 164, signaling system 166, navigation system 168, positioning system 170, and detection system 172 in order to control the movement, speed, etc. of vehicle 100 in accordance with the instructions 134 of memory 130. Again, although these systems are shown as external to computing device 110, in actuality, these systems may also be incorporated into computing device 110, again as an autonomous driving computing system for controlling vehicle 100.

As an example, computing device 110 may interact with deceleration system 160 and acceleration system 162 in order to control the speed of the vehicle. Similarly, steering system 164 may be used by computing device 110 in order to control the direction of vehicle 100. For example, if vehicle 100 is configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location. In this regard, the navigation system 168 and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information.

Figure 4:
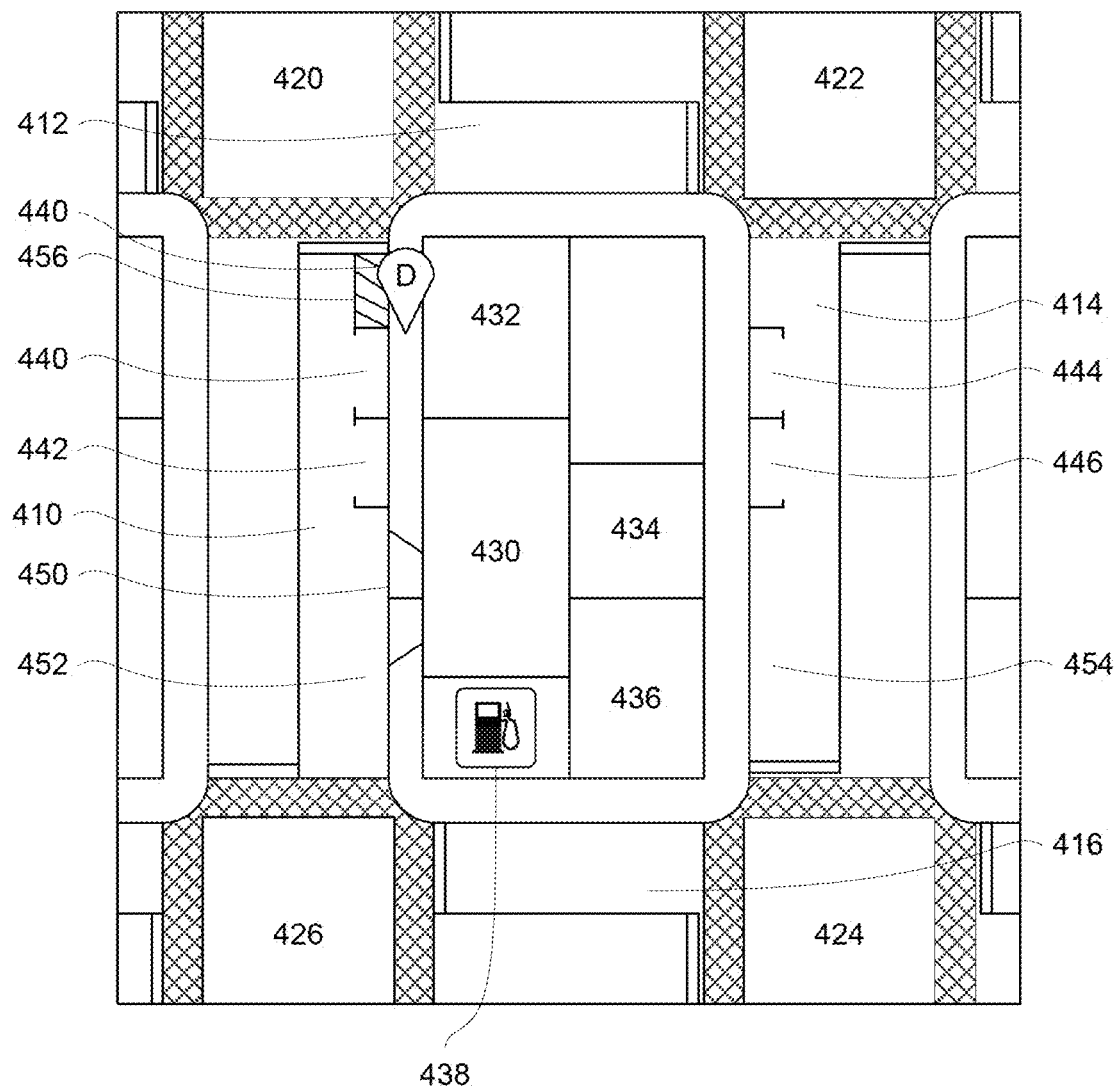
FIG. 4 is an example map in accordance with aspects of the disclosure.

Turning to FIG. 4, by way of example only, detailed map information may include the information depicted in map 400. In this example, the map includes a plurality of different features that identify the shape and location of various features such as lanes 410-416, intersections 420-426, buildings 430-438, parking spaces 440-446, a driveway entrance (for example to a parking garage or other location) 450, shoulder areas 452-454, and no parking zone 456. Together, these features correspond to an example of a single city block. The map 400 may be a part of the detailed maps described above and used by the various computing devices of vehicle 100 in order to maneuver the vehicle 100.

Returning to FIG. 1, positioning system 170 may be used by computing device 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with computing device 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The detection system 172 also includes one or more components for detecting objects external to the vehicle such as other vehicles, obstacles in the roadway, traffic signals, signs, trees, etc. For example, the detection system 170 may include lasers, sonar, radar, cameras and/or any other detection devices that record data which may be processed by computing device 110. In the case where the vehicle is a small passenger vehicle such as a car, the car may include a laser or other sensors mounted on the roof or other convenient location.

The computing device 110 may control the direction and speed of the vehicle by controlling various components. By way of example, computing device 110 may navigate the vehicle to a destination location completely autonomously using data from the detailed map information and navigation system 168. Computing device 110 may use the positioning system 170 to determine the vehicle's location and detection system 172 to detect and respond to objects when needed to reach the location safely. In order to do so, computing device 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 162 may be a part of a drivetrain that includes various components between an engine of the vehicle and the wheels of the vehicle. Again, by controlling these systems, computing device 110 may also control the drivetrain of the vehicle in order to maneuver the vehicle autonomously.

Figure 2:
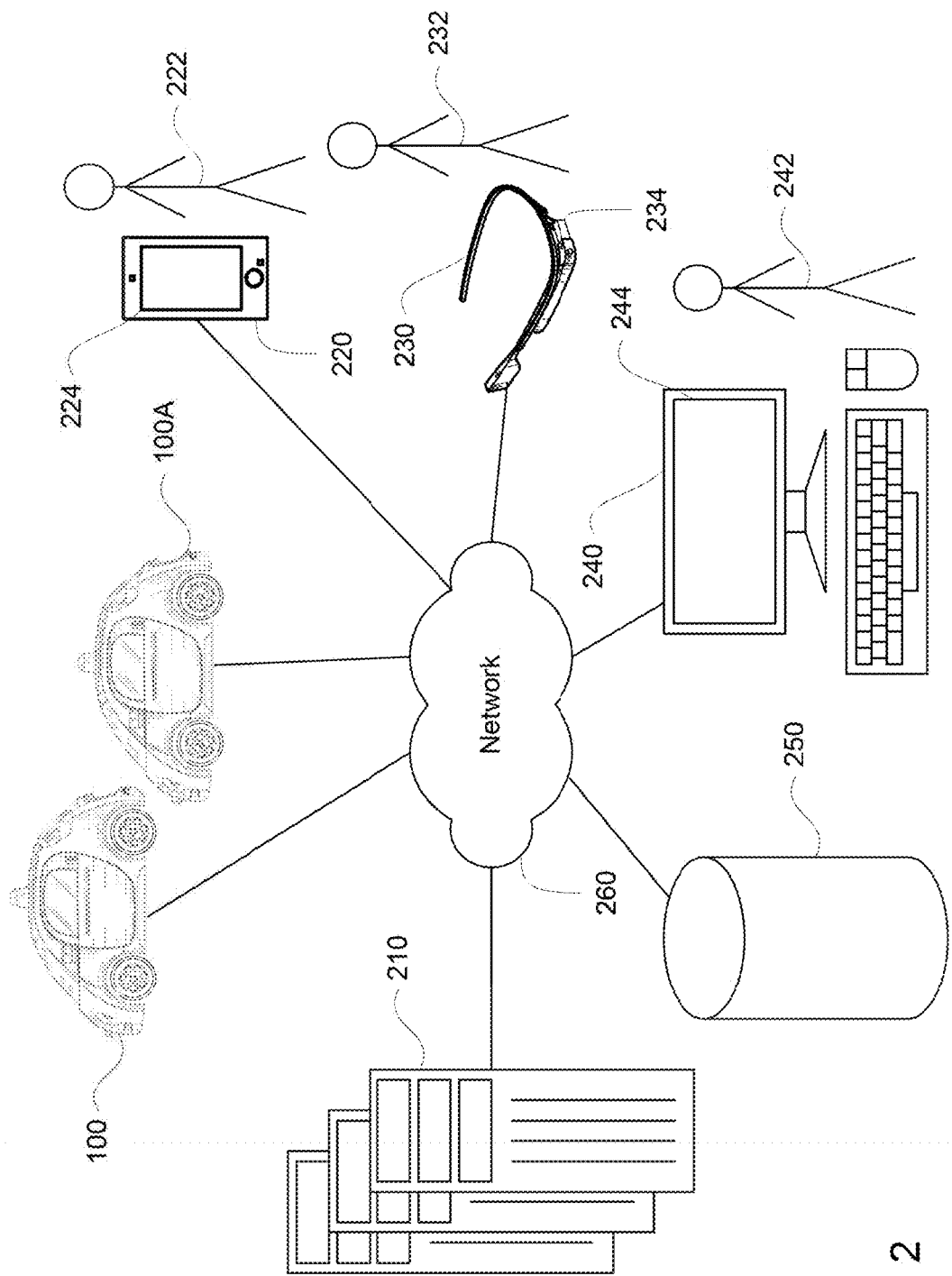
FIG. 2 is a functional diagram of an example system in accordance with an exemplary embodiment.
Figure 3:
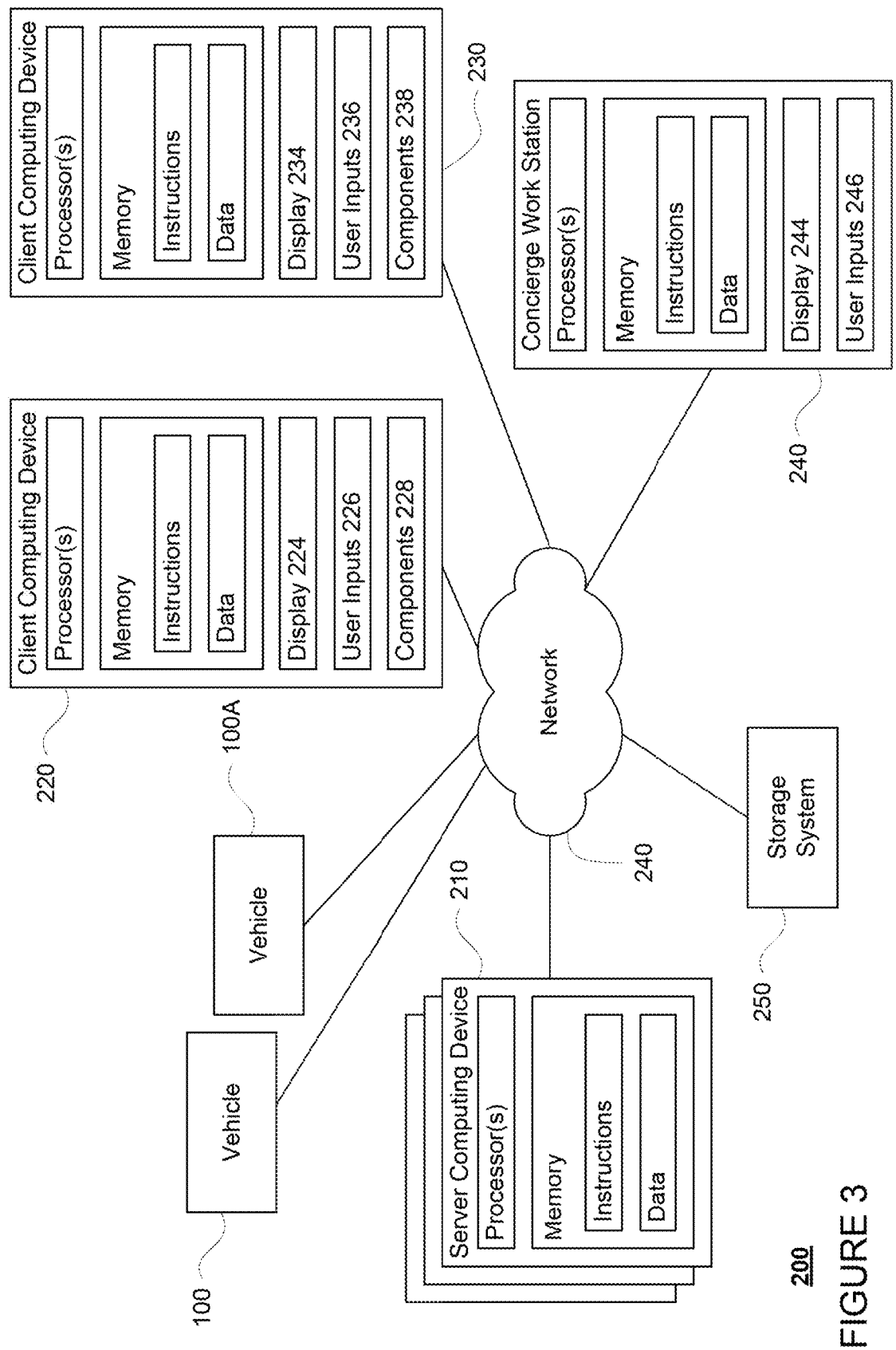
FIG. 3 is a pictorial diagram of the system of FIG. 2 in accordance with aspects of the disclosure.

Computing device 110 of vehicle 100 may also receive or transfer information to and from other computing devices. FIGS. 2 and 3 are pictorial and functional diagrams, respectively, of an example system 200 that includes a plurality of computing devices 210, 220, 230, 240 and a storage system 250 connected via a network 260. System 200 also includes vehicle 100, and vehicle 100A which may be configured similarly to vehicle 100. Although only a few vehicles and computing devices are depicted for simplicity, a typical system may include significantly more.

As shown in FIG. 3, each of computing devices 210, 220, 230, 240 may include one or more processors, memory, data and instructions. Such processors, memories, data and instructions may be configured similarly to one or more processors 120, memory 130, data 132, and instructions 134 of computing device 110.

The network 260, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 110 may include a server having a plurality of computing devices, e.g., a load balanced server farm, that exchange information with different nodes of a network for the purpose of receiving, processing and transmitting the data to and from other computing devices. These server computing devices may form part of a centralized dispatching system. For instance, one or more computing devices 210 may include one or more server computing devices that are capable of communicating with computing device 110 of vehicle 100 or a similar computing device of vehicle 100A as well as computing devices 220, 230, 240 via the network 260. For example, vehicles 100 and 100A may be a part of a fleet of vehicles that can be dispatched by server computing devices to various locations. In this regard, the vehicles of the fleet may periodically send the server computing devices location information provided by the vehicle's respective positioning systems and the one or more server computing devices may track the locations of the vehicles.

In addition, server computing devices 210 may use network 260 to transmit and present information to a user, such as user 222, 232, 242 on a display, such as displays 224, 234, 242 of computing devices 220, 230, 240. In this regard, computing devices 220, 230, 240 may be considered client computing devices.

As shown in FIG. 3, each client computing device 220, 230, 240 may be a personal computing device intended for use by a user 222, 232, 242, and have all of the components normally used in connection with a personal computing device including a one or more processors (e.g., a central processing unit (CPU)), memory (e.g., RAM and internal hard drives) storing data and instructions, a display such as displays 224, 234, 244 (e.g., a monitor having a screen, a touch-screen, a projector, a television, or other device that is operable to display information), and user input devices 226, 236, 246 (e.g., a mouse, keyboard, touch screen or microphone). The client computing devices may also include a camera for recording video streams, speakers, a network interface device, and all of the components used for connecting these elements to one another.

In addition, the client computing devices 220 and 230 may also include components 228 and 238 for determining the position and orientation of client computing devices. For example, these components may include a GPS receiver to determine the device's latitude, longitude and/or altitude as well as an accelerometer, gyroscope or another direction/speed detection device as described above with regard to positioning system 170 of vehicle 100.

Although the client computing devices 220, 230, and 240 may each comprise a full-sized personal computing device, they may alternatively comprise mobile computing devices capable of wirelessly exchanging data with a server over a network such as the Internet. By way of example only, client computing device 220 may be a mobile phone or a device such as a wireless-enabled PDA, a tablet PC, a wearable computing device or system, or a netbook that is capable of obtaining information via the Internet or other networks. In another example, client computing device 230 may be a wearable computing system, shown as a head-mounted computing system in FIG. 2. As an example the user may input information using a small keyboard, a keypad, microphone, using visual signals with a camera, or a touch screen.

In some examples, client computing device 240 may be a concierge work station used by an administrator to provide concierge services to users such as users 222 and 232. For example, a concierge 242 may use the concierge work station 240 to communicate via a telephone call or audio connection with users through their respective client computing devices or vehicles 100 or 100A in order to facilitate the safe operation of vehicles 100 and 100A and the safety of the users as described in further detail below. Although only a single concierge work station 240 is shown in FIGS. 2 and 3, any number of such work stations may be included in a typical system.

Storage system 250 may store various types of information as described in more detail below. This information may be retrieved or otherwise accessed by a server computing device, such as one or more server computing devices 210, in order to perform some or all of the features described herein. For example, the information may include user account information such as credentials (e.g., a user name and password as in the case of a traditional single-factor authentication as well as other types of credentials typically used in multi-factor authentications such as random identifiers, biometrics, etc.) that can be used to identify a user to the one or more server computing devices. The user account information may also include personal information such as the user's name, contact information, identifying information of the user's client computing device (or devices if multiple devices are used with the same user account), as well as one or more unique signals for the user.

The storage system 250 may also store routing data for generating and evaluating routes between locations. For example, the routing information may be used to estimate how long it would take a vehicle at a first location to reach a second location. In this regard, the routing information may include map information, not necessarily as particular as the detailed map information described above, but including roads, as well as information about those roads such as direction (one way, two way, etc.), orientation (North, South, etc.), speed limits, as well as traffic information identifying expected traffic conditions, etc.

As with memory 130, storage system 250 can be of any type of computerized storage capable of storing information accessible by the server computing devices 210, such as a hard-drive, memory card, ROM, RAM, DVD, CD-ROM, write-capable, and read-only memories. In addition, storage system 250 may include a distributed storage system where data is stored on a plurality of different storage devices which may be physically located at the same or different geographic locations. Storage system 150 may be connected to the computing devices via the network 260 as shown in FIG. 2 and/or may be directly connected to or incorporated into any of the computing devices 110, 210, 220, 230, 240, etc.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

In one aspect, a user may download an application for requesting a vehicle to a client computing device. For example, users 222 and 232 may download the application via a link in an email, directly from a website, or an application store to client computing devices 220 and 230. For example, client computing device may transmit a request for the application over the network, for example, to one or more server computing devices 210, and in response, receive the application. The application may be installed locally at the client computing device.

Figure 5:
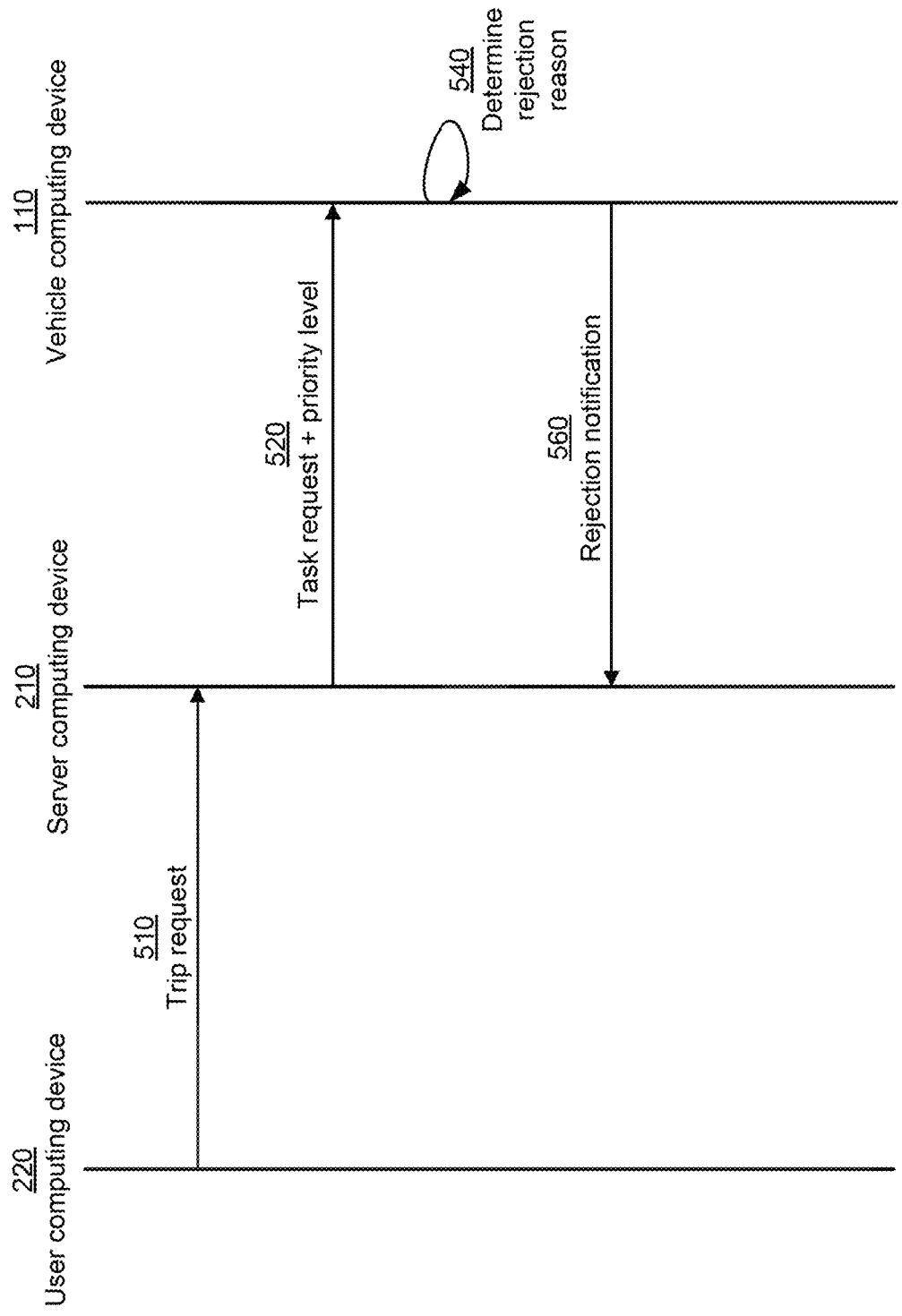
FIG. 5 is an example diagram in accordance with aspects of the disclosure.

FIG. 5 is a diagram of an embodiment of the method and system described herein. Accessing the installed application on his or her client computing device, a user may request a vehicle. As an example, at step 510, a user such as user 222 may use client computing device 220 to send a request for a passenger-related task, or a trip request, to one or more server computing devices 210 for a vehicle. The request may include information identifying a pickup location or area and/or a destination location or area. As an example, such location may be identified by street addresses, location coordinates, points of interest, etc. In response, the one or more server computing devices 210 may identify and dispatch, for example based on availability and location, a vehicle to the pickup location. This dispatching may involve sending information to the vehicle identifying the user (and/or the user's client device), the pickup location, and the destination location or area.

At step 520, the server computing device 210 may send a task request to the vehicle 100 in response to a trip request from a user. Alternatively, the task request may be sent to the vehicle 100 independent from a trip request. The vehicle 100 may be parked or performing a task when the task request is received. The task request may include information requesting that the vehicle perform a particular task. A task request for a non-passenger task may provide instructions to the vehicle's computing device 110 for performing a task unrelated to transporting a passenger. The vehicle's computing device 110 may store the received task requests as a task in a task queue.

In addition, a non-passenger task request may be transmitted to a vehicle 100 based on the state of the vehicle. The autonomous vehicle 100 may be continuously publishing measurements from the battery, fuel tank, odometer, and other instruments or gauges of the vehicle. If, for example, the energy in the vehicle's battery drops below a threshold, the server computing device may initiate a non-passenger task request for recharging the vehicle 100.

Depending on the nature of the non-passenger task, different levels of detail may be specified in the non-passenger task request. For example, non-passenger tasks that involve driving to a type of location, such as a charging station, may explicitly specify the location or region where the vehicle should go for that task. Alternatively, non-passenger task requests may leave the determination of a specific location or region to the computing devices of the vehicle.

The server computing device may also specify a priority level of tasks. As shown in FIG. 5 at step 520, a task request may be sent with a priority level. The priority level may include details as to when the task should be executed in relation to existing tasks; for example, to execute when the vehicle has no pending non-passenger or passenger task requests or, on the other hand, to execute before any other task in the queue. The priority level may also include what types of non-passenger or passenger tasks may interrupt the task. For example, the task of parking the vehicle in a nearby lot may be a low priority, such that the vehicle's computing device inserts the task at the end of the queue. Low priority tasks may thus be set to allow preemption by any type of incoming task having a higher priority level. On the other hand, the priority level of a task of recharging the vehicle after low battery is detected may be high, such that the vehicle's computing device inserts the task in the queue before all other existing tasks. In addition, as a high priority level task, the recharging task may be set to prohibit preemption by any incoming tasks having lower priority levels.

An incoming task may be rejected by a vehicle's computing devices 110. To reject a task, the vehicle's computing device 110 may determine whether one of several enumerated rejection reasons applies upon receipt of the task and before the task is inserted in the task queue and executed, as shown in step 540 of FIG. 5. By way of example, rejection reasons may include (1) the vehicle is handling a task which does not allow preemption by the incoming task; (2) the task request is malformed; and (3) the vehicle is not capable of performing the incoming task.

A malformed task request may be one sent with a trip request where the priority level of the task request would effectively cancel the trip before the trip has been executed. For example, a trip request may be sent with a non-passenger task request for parking nearby and waiting for the next request. In this situation, if the non-passenger task of parking nearby and waiting for the next request has a higher priority than the trip request, the trip would never be executed. Additionally, a malformed task request may be one that overrides a currently executed trip request without addressing the presence of passengers. If passengers have already been picked up in the execution of a trip request, an incoming non-passenger task request that overrides the trip request is malformed. If the task request were to override the trip request at that moment, the vehicle would be diverted with its passengers to a different location than what was requested. Also, examples of a task request that may be rejected because the vehicle is not capable of performing the task may include a charging task sent to a gas powered vehicle or a parking task specifying a parking location that is inaccessible by an autonomous vehicle. There may be other rejection reasons that are included in the system that are not listed here.

If the task request is rejected, the task request may not be inserted into the task queue for future execution. As shown in step 560, if a task request is rejected, the vehicle's computing devices 110 may also send a response to the server computing device 210 indicating that the task request was rejected and the reason for the rejection. A similar notification may also be sent to the client computing device 220 when the task request was for a passenger related task.

Figure 6:
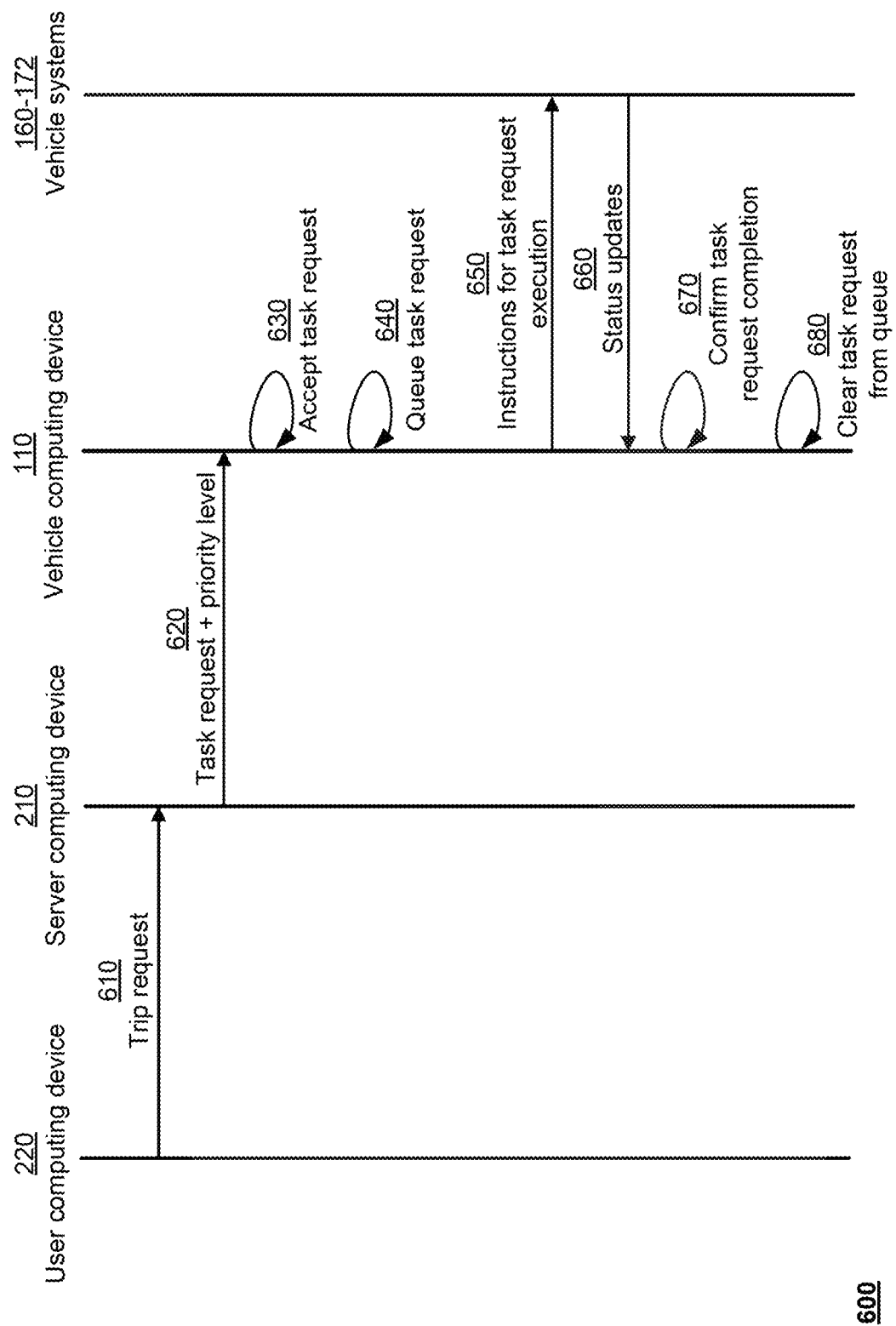
FIG. 6 is an example diagram in accordance with aspects of the disclosure.

On the other hand, if a task request is accepted, the task specified by the task request may be inserted in the queue stored in the memory 130 based on that task's priority level and the priority levels of any existing tasks. Turning to FIG. 6, as discussed with respect to FIG. 5, a trip request may be sent to server computing device 210 via user computing device 220 at step 610 as with step 510 of FIG. 5. A task request with a priority level may be sent from the server computing device 210 to the vehicle's computing device 110 at step 620 as with step 520 of FIG. 5. At step 630, the vehicle's computing device 110 accepts the task request and proceeds to insert the task request into the queue at step 640. If the priority of the incoming task request is lower than that of the current task or a task that the vehicle's computer is currently performing or beginning to perform, the computing devices may insert the incoming task request into the queue to be performed after the completion of the current task. And, if the priority of the incoming task request is higher than that of the current task, the current task request may be preempted by inserting the task specified in the incoming task request in the queue before the current task.

Figure 8:
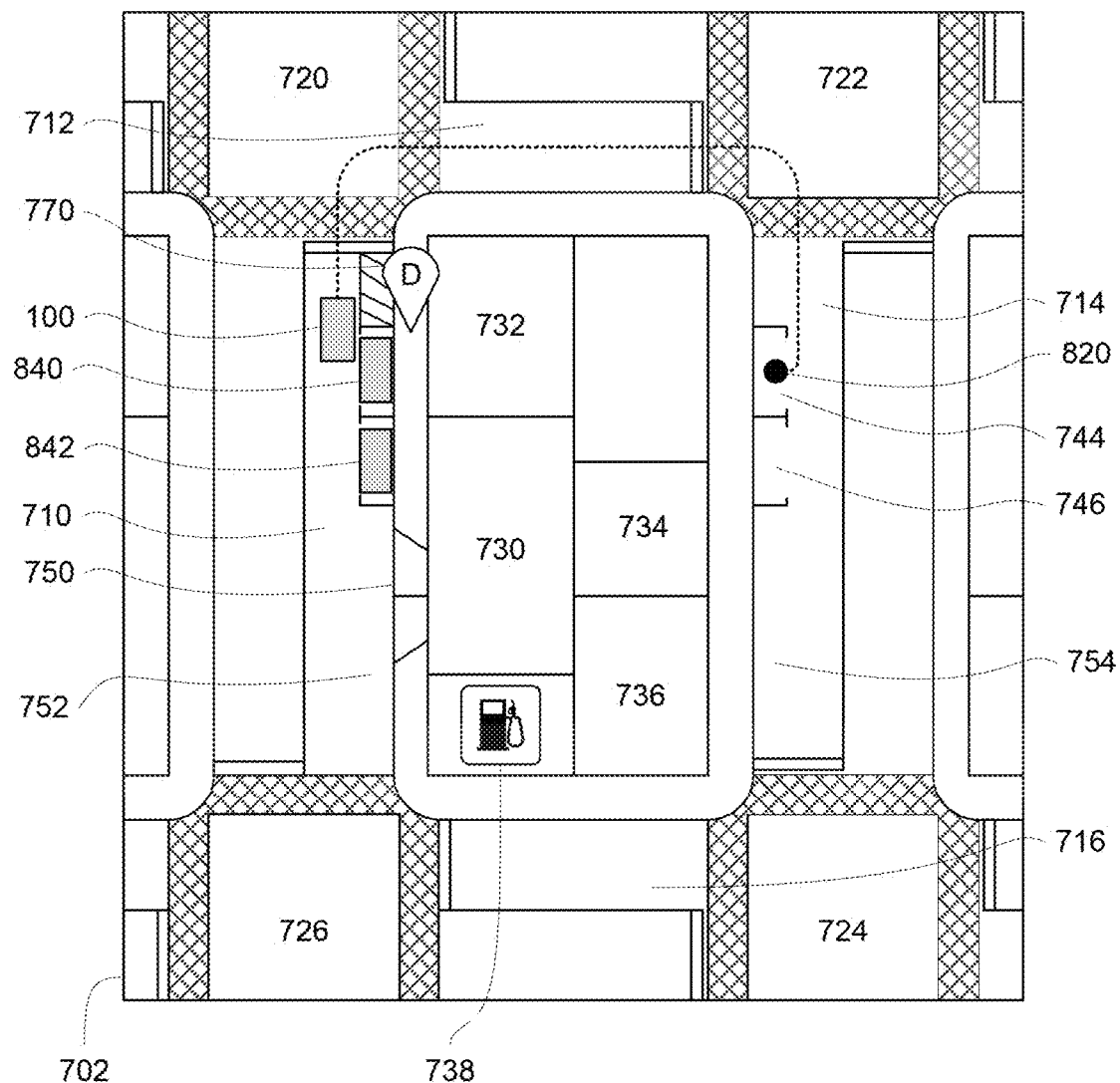
FIG. 8 is another example bird's eye view of a geographic area in accordance with aspects of the disclosure.
Figure 9:
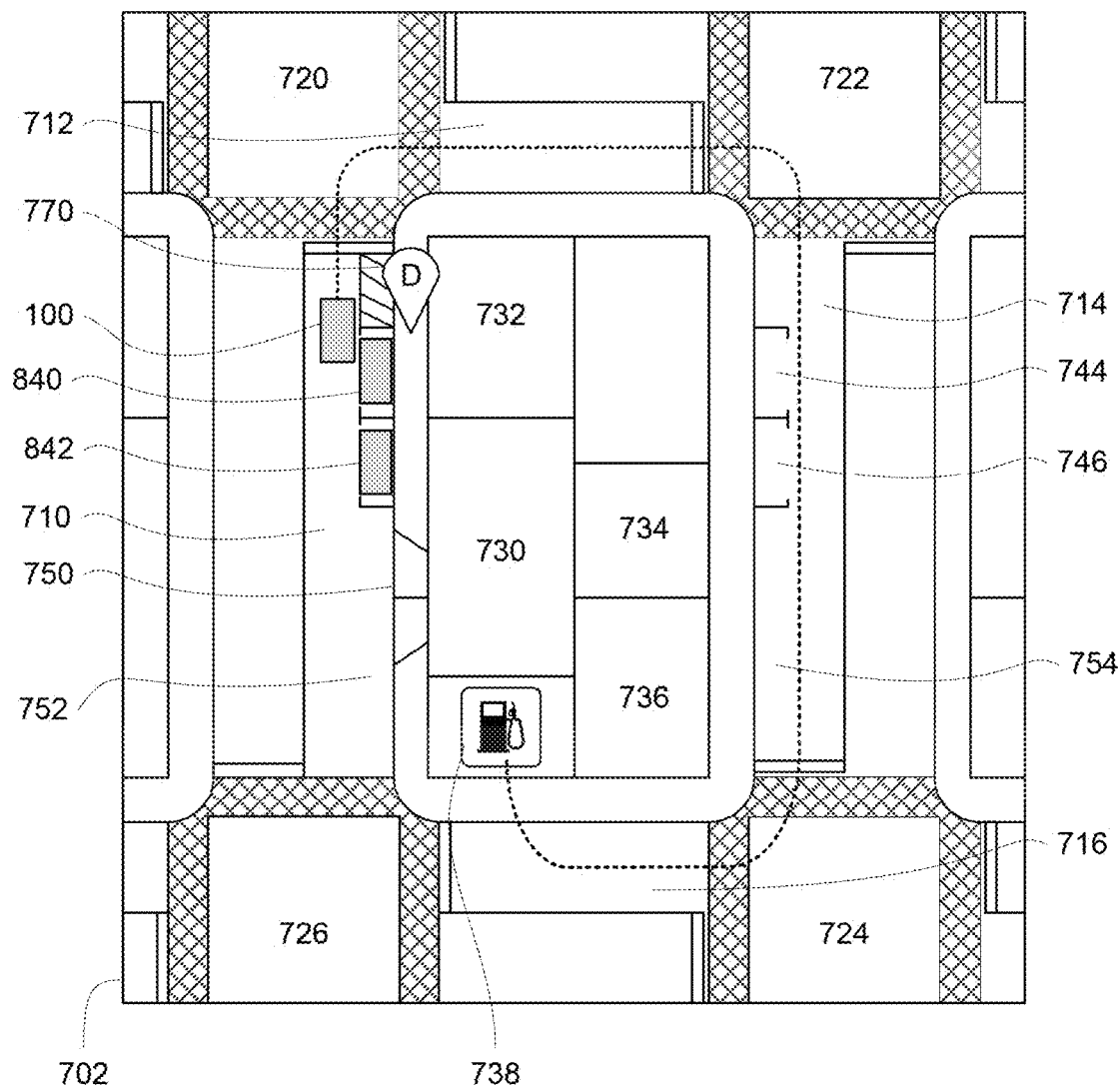
FIG. 9 is a further example bird's eye view of a geographic area in accordance with aspects of the disclosure.

Tasks may be executed in the order in which they appear in the task queue. Executing a task request may involve one or more self-driving systems 160-172 in the vehicle 100 depending on a type of task. As shown in step 650 of FIG. 6, the vehicle's computing devices 110 may send instructions regarding execution of the task request, such as control commands and navigation commands, to one or more of the vehicle's self-driving systems 160-172. In response, the vehicle's self-driving systems 160-172 may perform the task. For example, a task to park the vehicle, as shown in FIG. 8, may involve only the self-driving systems 160-172. A task to refuel and/or recharge or to perform some maintenance or service, as shown in FIG. 9, may involve the self-driving systems as well as other systems. For instance, an authentication or communication system may be used to perform any authentication or communication between the vehicle 100 and the system performing the refueling/recharging.

The vehicle's computing device 110 may determine the vehicle's progress in executing the task request by receiving frequent status updates. As shown in FIG. 6 at step 660, the vehicle self-driving systems 160-172 may continuously or periodically send status updates to the vehicle's computing device 110 as the task request is executed. By way of example only, status updates may include the vehicle's location, the vehicle's speed, whether headlights are on, the frequency of operation of windshield wipers, and the fuel level. Through monitoring the status of the vehicle, the vehicle's computing device 110 may determine when a task request is completed. For example, if the task request was to drive to a specified location, the task request may be considered completed when the vehicle 100 is determined to be currently located at the specified location.

As further shown in step 670 of FIG. 6, after a task is completed, the vehicle's computing device 110 of the autonomous vehicle may confirm that the task is complete based on the status updates discussed above. In the case of tasks involving parking, the vehicle's computing device 110 and one or more of the self-driving systems 160-172 of the vehicle 100 may ensure that the vehicle is firmly parked. As an example, using the status updates 660, the vehicle's computing device 110 may confirm that the vehicle 100 is stationary, that the engine is turned off, and that the parking brake is on. The vehicle's computing device 110 and self-driving systems 160-172 may perform different types of checks on vehicle 100 prior to sending confirmation of a task completion, for example, one type of check may ensure that the vehicle is firmly parked.

However, for some task requests, completion is contingent on receiving a task request having a higher priority level. These particular tasks may remain in the queue and be continuously executed until a task request having a higher priority level than the particular tasks is received and queued. For example, for the non-passenger task of circling the block, shown in FIG. 10, no completion confirmation may be performed as described above with respect to a parking task, but rather, the vehicle 100 may continue circling the block until a higher priority task is received.

When a task request having a higher priority level is received, the particular task may be determined to be and confirmed as complete.

Once completion of a task is confirmed, the completed task may be cleared from the queue, as shown in step 680 of FIG. 6. When another passenger-related or non-passenger task is in the queue, the vehicle's computing device 110 may then execute this other task in the autonomous vehicle 100. When there are no other tasks in the queue, the vehicle 100 may perform a default action, such as parking the vehicle 100 or remaining parked until a new task request is received.

Figure 7:
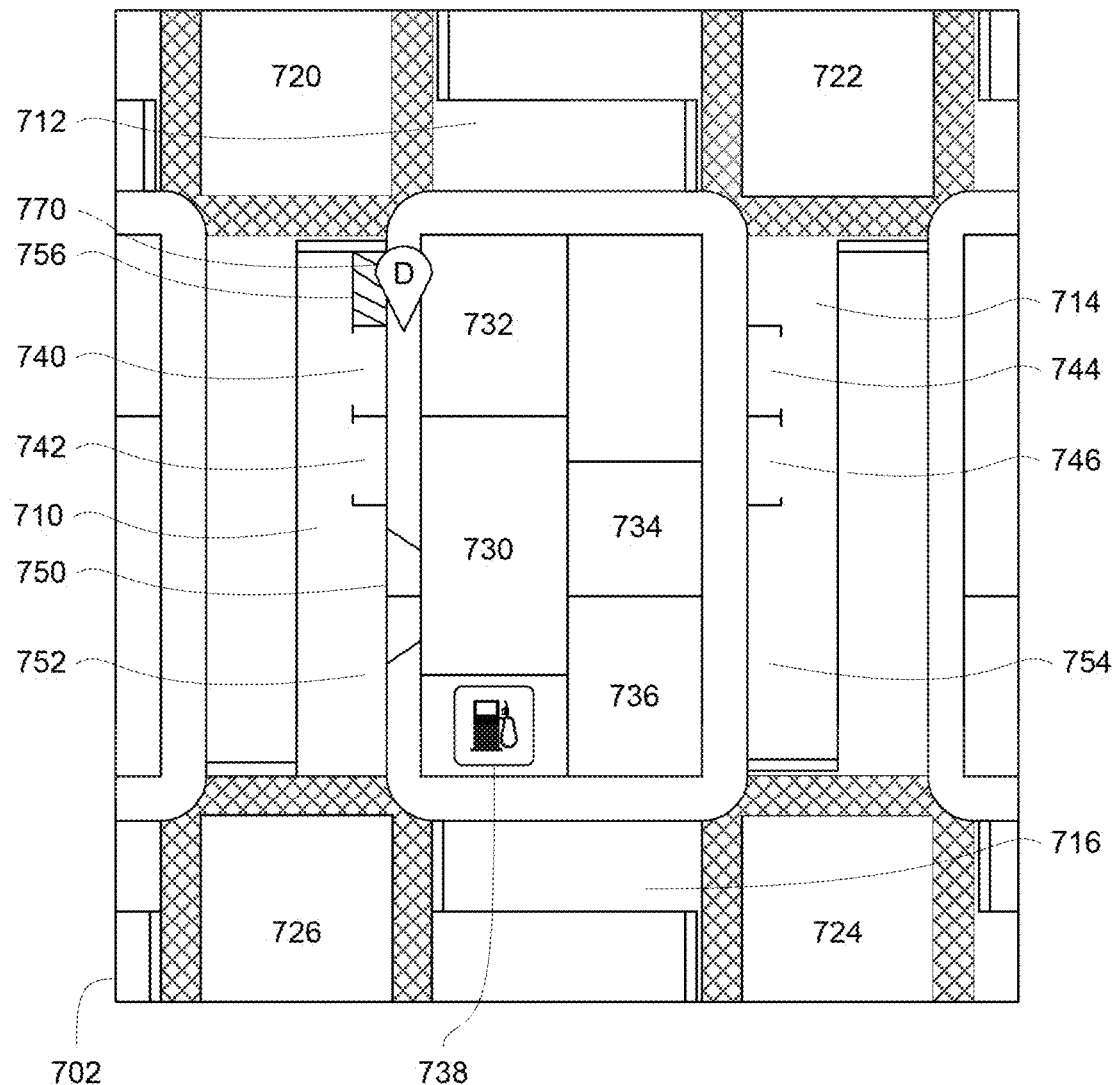
FIG. 7 is an example bird's eye view of a geographic area in accordance with aspects of the disclosure.

Now, further examples of non-passenger task requests will be discussed. These examples are merely illustrative and not meant to be limiting in any way. FIG. 7 is an example of a bird's eye view 700 of a geographic area 702 corresponding to the area of map 400. In this example, the geographical area includes various features such as lanes 710-716, intersections 720-726, buildings 730-738, parking spaces 740-746, a driveway entrance (for example to a parking garage or other location) 750, shoulder areas 752-754, and no parking zone 756 that correspond to each of lanes 410-416, intersections 420-426, buildings 430-438, parking spaces 440-446, a driveway entrance (for example to a parking garage or other location) 450, shoulder areas 452-454, and no parking zone 456 of the map 400. In this example, map pin 770 is for reference only and identifies the physical location of destination location D for a passenger-related task currently being executed by vehicle 100.

Vehicle 100 may receive a passenger-related task request 520, 620 to drop off a passenger at destination location D. The task request may include a non-passenger task with a lower priority level than the passenger-related task. Therefore, the non-passenger task request may be inserted in the task queue 630 of vehicle 100 after the passenger-related task request. After vehicle 100 drops off the passenger at destination location D, the passenger-related task may be cleared from the queue and the non-passenger task may be executed.

As shown in FIG. 8, vehicle 100, having reached a position in lane 710 adjacent to destination location D and presumably having completed the passenger-related task, may execute the non-passenger task of prepositioning vehicle 100 for future user-initiated requests. This may be the default non-passenger task to be performed in the absence of other tasks. The non-passenger task request may include information about where vehicle 100 may park near destination location D or may include instructions for the computing devices 110 to access map data 400 and make the determination. The computing devices 110 may use the detection system 172 to determine whether a parking spot is unoccupied. The sensors of detection system 172 may detect vehicles 840 and 842 in parking spots 740 and 742, so vehicle 100 may navigate to parking spots 744 and 746 in lane 714 to see if they are available. As shown in FIG. 8, a route for vehicle 100 to take may be determined, and instructions may be sent 650 to the vehicle's self-driving systems 160-172 to navigate to parking spots 744 and 746. Vehicle 100 may be parked at position 820 and await further task requests from users in the vicinity. Similarly, the passenger may set the non-passenger related task request of parking in the vicinity of destination location D, such that the passenger may use vehicle 100 again once he or she is ready to leave the area.

As shown in FIG. 9, vehicle 100 may execute the non-passenger task of refueling after dropping the passenger off at destination location D. This non-passenger task request may be sent with the passenger-related task request when computing devices 110 determine that the fuel level will likely be below a threshold upon completion of the passenger-related task request. Alternatively, a user may set the non-passenger task request as refueling whenever he or she sees fit. Information about the fueling stations nearest to destination location D may be determined by the server computing device 210 and sent to the vehicle's computing device 110. In other examples, instructions may be sent that may cause the vehicle's computing device 110 to determine which fueling station is nearest. In this example, fueling station 738 is nearest. The computing devices 110 may determine a route and send instructions 650 to the vehicle's self-driving systems 160-172 to navigate to fueling station 738.

Figure 10:
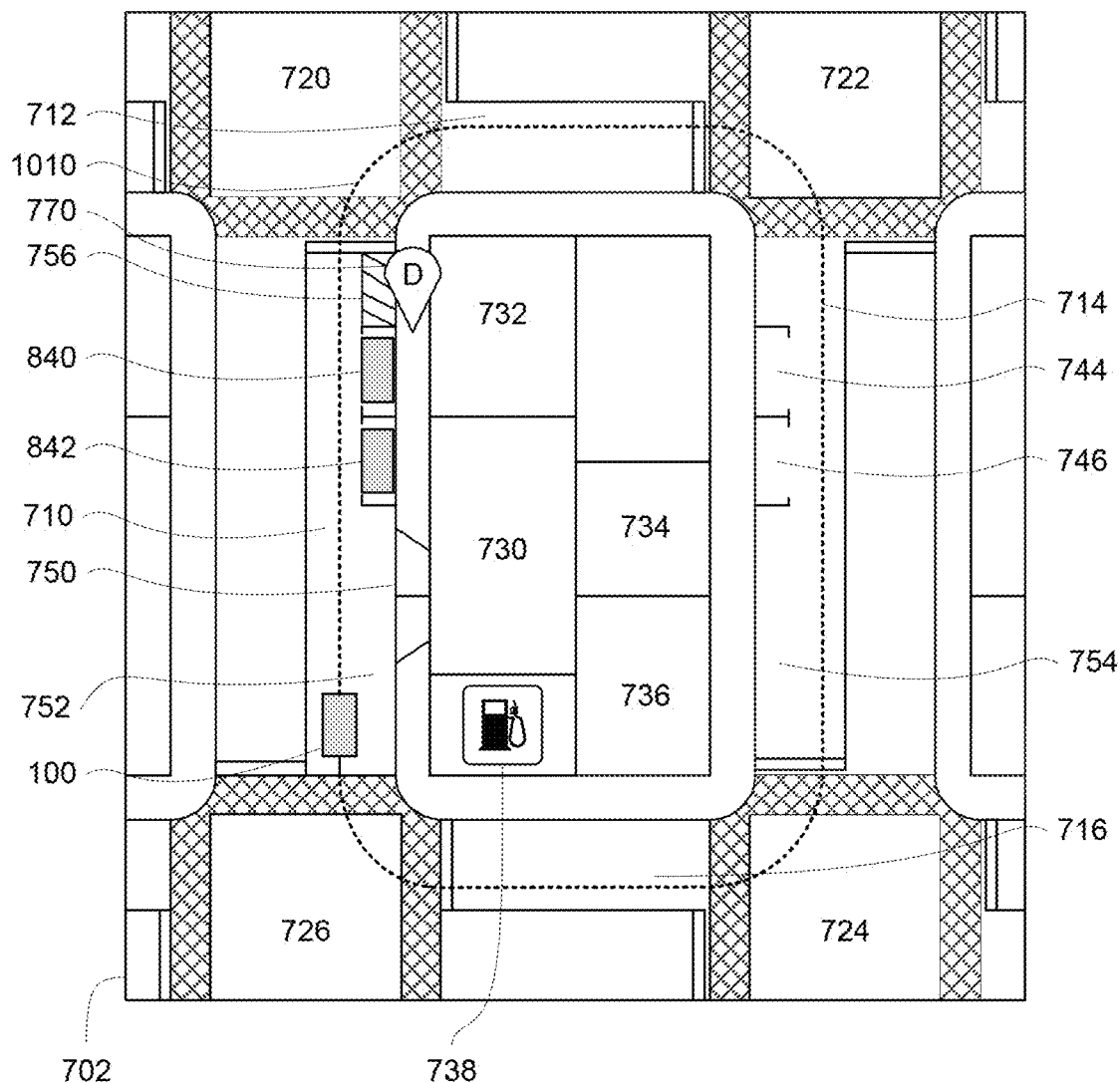
FIG. 10 is an example bird's eye view of a geographic area in accordance with aspects of the disclosure.

As shown in FIG. 10, vehicle 100 may execute the non-passenger task of circling the block after dropping off the passenger at destination location D. This non-passenger task request may be sent with the passenger-related task request when computing devices 110 determine that the fuel level is above a certain threshold and/or there is a high probability that vehicle 100 would be quickly dispatched for another passenger-related task request. Alternatively, a user may set the non-passenger task request as circling the block whenever he or she sees fit. Information in the non-passenger task request may include a route for vehicle 100 to follow, such as route 1310. In other examples, the vehicle's computing device 110 may determine the route 1010 for circling an area. The vehicle computing devices may send instructions 650 to the vehicle's self-driving systems 160-172 to follow the prescribed route 1010.

Figure 11:
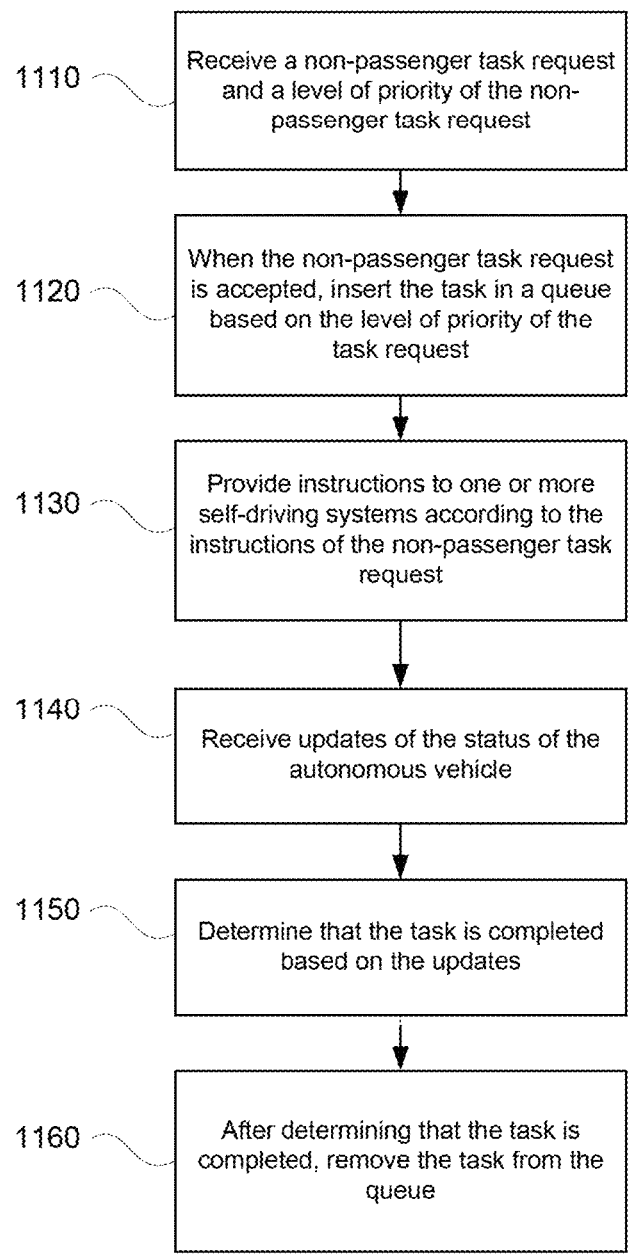
FIG. 11 an example flow diagram in accordance with aspects of the disclosure.

FIG. 11 is a flow diagram 1100 in accordance with some of the aspects described above that may be performed by one or more computing devices 110 of vehicle 100. While FIG. 11 shows blocks in a particular order, the order may be varied and that multiple operations may be performed simultaneously. Also, operations may be added or omitted.

At block 1110, a vehicle may receive a non-passenger task request and a priority level of the non-passenger task request 620. The vehicle's computing device 110 may accept the task request 630 and insert the task request in a queue 640 in the vehicle's memory 130 based on the priority level of the task request at block 1120. According to the instructions of the non-passenger task request received by the vehicle, the vehicle's computing device 110 may provide instructions 650 to one or more self-driving systems 160-172 at block 1130. At block 1140, updates may be received 660 at the vehicle's computing device 110 of the status of the autonomous vehicle periodically or continuously. Further, at block 1150, based on the received updates, the vehicle's computing device 110 may confirm that the non-passenger task is completed 670. Then, after confirming that the task is completed, the one or more computing devices may remove the task from the queue 680 at block 1160.

The features described above may provide for a practical way for an autonomous vehicle to execute non-passenger tasks in the absence of a passenger-related task. Such features may prevent situations where a vehicle remains in the middle of a street or a no parking zone after dropping off a passenger. The features may also provide for execution of non-passenger tasks that may ensure proper operation of the vehicle, thereby avoiding or reducing the likelihood of situations in which a vehicle is in the middle of executing a trip when the vehicle runs out of battery or fuel or the vehicle ends up in a cell dead zone unable to receive further tasks. Further, the features may also improve fleet efficiency/utilization and reduce wait times for passenger tasks.

In addition, the features described above may provide for a system that may operate without continual connection to a remote server. Once tasks are received, the system of the autonomous vehicle disclosed may execute passenger-related, non-passenger, and fallback tasks while not in communication with a management system. The vehicle is free to execute tasks where there may not be a strong connection to the remote server. Tasks may be executed in quick succession without the need to check in with the remove server. These features allow a system managing autonomous vehicles to perform other tasks instead of micromanaging what every vehicle is doing at every moment.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A system for managing a transportation system including a plurality of autonomous vehicles comprising one or more server computers including one or more processors configured to:
   continuously receive updates regarding statuses of the plurality of autonomous vehicles, the continuously received updates including one or more measurements published from one or more instruments of the plurality of autonomous vehicles;
   determine based on the continuously received updates, non-passenger task requests associated with the plurality of autonomous vehicles;
   for each respective one of the non-passenger task requests:
      determine, based on the continuously received updates, a priority level indicating when a non-passenger task of the respective one of the non-passenger task requests should be executed by one or more computing devices of a respective autonomous vehicle of the plurality of autonomous vehicles in relation to any existing tasks in a queue of the respective autonomous vehicle of the plurality of autonomous vehicles, the non-passenger task being unrelated to transporting a passenger in the respective autonomous vehicle of the plurality of autonomous vehicles; and
      determine a destination location based on a location associated with a preceding task in the queue of the respective autonomous vehicle of the plurality of autonomous vehicles;
   generate dispatch commands, each respective one of the dispatch commands including at least one of the non-passenger task requests, the priority level for the at least one of the non-passenger task requests, and the destination location for the at least one of the non-passenger task requests; and
   send each respective one of the dispatch commands to the one or more computing devices of the respective autonomous vehicle of the plurality of autonomous vehicles.

2. The system of claim 1, wherein the one or more processors are further configured to receive one or more notifications that one or more of the non-passenger task requests have been rejected by one or more computing devices of the plurality of autonomous vehicles.

3. The system of claim 2, wherein the one or more notifications include one or more rejection reasons.

4. The system of claim 1, wherein the one or more processors are further configured to:
   receive a user task request from a user device; and
   wherein at least one of the dispatch commands is generated according to the user task request.

5. The system of claim 1, wherein at least one of the dispatch commands further includes a passenger-related task request and a priority level of the passenger-related task request, the passenger-related task request being related to transporting a passenger in one or more of the plurality of autonomous vehicles and having a higher priority level than the non-passenger task request.

6. The system of claim 1, further comprising one or more autonomous vehicles of the plurality of autonomous vehicles, the one or more autonomous vehicles being capable of autonomously driving.

7. The system of claim 1, wherein the one or more measurements include fuel or battery levels of one or more of the plurality of autonomous vehicles; and
   wherein the one or more processors are further configured to determine one or more of the non-passenger task requests as including refueling or recharging of the one or more of the plurality of autonomous vehicles when the fuel or battery levels of the one or more of the plurality of autonomous vehicles are below a threshold.

8. A method for managing a transportation system including a plurality of autonomous vehicles, the method comprising:
   continuously receiving, by one or more processors of one or more server computers, updates regarding statuses of the plurality of autonomous vehicles, the continuously received updates including one or more measurements published from one or more instruments of the plurality of autonomous vehicles;
   determining, by the one or more processors based on the continuously received updates, non-passenger task requests;
   for each respective one of the non-passenger task requests:
      determining, by the one or more processors based on the continuously received updates, a priority level indicating when a non-passenger task of the respective one of the non-passenger task requests should be executed by one or more computing devices of a respective autonomous vehicle of the plurality of autonomous vehicles in relation to any existing tasks in a queue of the respective autonomous vehicle of the plurality of autonomous vehicles, the non-passenger task being unrelated to transporting a passenger in the respective autonomous vehicle of the plurality of autonomous vehicles; and
      determining, by the one or more processors, a destination location based on a location associated with a preceding task in the queue of the respective autonomous vehicle of the plurality of autonomous vehicles;
   generating, by the one or more processors, dispatch commands, each respective one of the dispatch commands including at least one of the non-passenger task requests, the priority level for the at least one of the non-passenger task requests, and the destination location for the at least one of the non-passenger task requests; and sending, by the one or more processors, each respective one of the dispatch commands to the respective autonomous vehicle of the plurality of autonomous vehicles.

9. The method of claim 8, further comprising receiving, by the one or more processors, one or more notifications that one or more of the non-passenger task requests have been rejected by one or more computing devices of the plurality of autonomous vehicles.

10. The method of claim 9, wherein the one or more notifications include one or more rejection reasons.

11. The method of claim 8, further comprising:
receiving, by the one or more processors, a user task request from a user device; and
generating, by the one or more processors, at least one of the dispatch commands in response to the user task request.

12. The method of claim 8, wherein at least one of the dispatch commands further includes a passenger-related task request and a priority level of the passenger-related task request, the passenger-related task request being related to transporting a passenger in one or more of the plurality of autonomous vehicles and having a higher priority level than the non-passenger task request.

13. The method of claim 8, wherein the one or more measurements include fuel or battery levels of one or more of the plurality of autonomous vehicles; and
wherein determining the non-passenger task requests includes determining whether the fuel or battery levels of the one or more of the plurality of autonomous vehicles are below a threshold and determining the non-passenger task as including refueling or recharging of the one or more of the plurality of autonomous vehicles in response to determining that the fuel or battery level of the one or more of the plurality of autonomous vehicles is below the threshold.

14. A non-transitory, tangible computer-readable storage medium on which computer readable instructions of a program are stored, wherein the instructions, when executed by one or more computing devices, cause the one or more computing devices to perform a method or managing a transportation system including a plurality of autonomous vehicles, the method comprising:
continuously receiving updates regarding statuses of the plurality of autonomous vehicles, the continuously received updates including one or more measurements published from one or more instruments of the plurality of autonomous vehicles;
determining, based on the continuously received updates, non-passenger task requests;
for each respective one of the non-passenger task requests:
determining, based on the continuously received updates, a priority level indicating when a non-passenger task of the respective one of the non-passenger task requests should be executed by one or more computing devices of a respective autonomous vehicle of the plurality of autonomous vehicles in relation to any existing tasks in a queue of the respective autonomous vehicle of the plurality of autonomous vehicles, the non-passenger task being unrelated to transporting a passenger in the respective autonomous vehicle of the plurality of autonomous vehicles; and
determining a destination location based on a location associated with a preceding task in the queue of the respective autonomous vehicle of the plurality of autonomous vehicles;
generating dispatch commands, each respective one of the dispatch commands including at least one of the non-passenger task requests and the priority level for the at least one of the non-passenger task requests, and the destination location for the at least one of the non-passenger task requests; and
sending each respective one of the dispatch commands to the respective autonomous vehicle of the plurality of autonomous vehicles.

15. The medium of claim 14, wherein the method further comprises receiving one or more notifications that one or more of the non-passenger task requests have been rejected by one or more computing devices of the plurality of autonomous vehicles.

16. The medium of claim 15, wherein the one or more notifications include one or more rejection reasons.

17. The medium of claim 14, wherein the one or more measurements include fuel or battery levels of one or more of the plurality of autonomous vehicles; and
wherein determining the non-passenger task requests includes determining whether the fuel or battery levels of the one or more of the plurality of autonomous vehicles are below a threshold and determining the non-passenger task as including refueling or recharging of the one or more of the plurality of autonomous vehicles in response to determining that the fuel or battery level of the one or more of the plurality of autonomous vehicles is below the threshold.

* * * * *